United States Patent [19]

Morales et al.

[11] Patent Number: 4,743,574
[45] Date of Patent: May 10, 1988

[54] CATALYST FOR HYDROTREATMENT OF DISTILLATES OF PETROLEUM AND METHOD FOR THE PREPARATION OF SAME

[75] Inventors: Alfredo L. Morales; Juan J. Garcia, both of San Antonio de Los Altos, Venezuela

[73] Assignee: Intevep, S.A., Caracas, Venezuela

[21] Appl. No.: 817,367

[22] Filed: Jan. 9, 1986

[51] Int. Cl.$^4$ .................. B01J 21/02; B01J 27/14; B01J 27/188; B01J 27/19

[52] U.S. Cl. .................. 502/206; 502/202; 502/204; 502/207; 502/208; 502/210; 502/211; 502/213; 502/221; 208/114; 208/123; 208/124; 208/216 R; 208/217

[58] Field of Search .............. 502/202, 204, 206, 207, 502/208, 210, 211, 213, 221

[56] References Cited

U.S. PATENT DOCUMENTS

| | | | |
|---|---|---|---|
| 2,440,236 | 4/1948 | Stirton | 502/211 |
| 2,441,297 | 4/1948 | Stirton | 502/208 X |
| 3,232,888 | 2/1966 | Odom | 502/210 X |
| 3,453,219 | 7/1969 | O'Hara | 502/206 |
| 3,617,528 | 11/1971 | Hilfman | 502/210 X |
| 3,637,525 | 1/1972 | O'Hara | 502/206 |
| 3,649,523 | 3/1972 | Bertolacini et al. | 502/73 X |
| 3,749,663 | 7/1973 | Mickelson | 502/211 X |
| 3,755,150 | 8/1973 | Mickelson | 502/211 X |
| 3,830,752 | 8/1974 | Mickelson | 502/210 X |
| 3,840,472 | 10/1974 | Colgan et al. | 502/211 X |
| 3,894,056 | 7/1975 | Bertus et al. | 502/211 X |
| 3,969,273 | 7/1976 | Brown et al. | 502/211 |
| 4,028,273 | 6/1977 | O'Hara et al. | 502/206 |
| 4,034,061 | 7/1977 | McArthur | 502/207 X |
| 4,039,476 | 8/1977 | Bertus et al. | 502/211 |
| 4,134,856 | 1/1979 | Itoh et al. | 502/207 X |
| 4,306,965 | 12/1981 | Hensley, Jr. et al. | 502/255 X |
| 4,317,746 | 3/1982 | Richardson | 502/211 |
| 4,382,854 | 5/1983 | Wilson et al. | 502/211 X |
| 4,389,304 | 6/1983 | Eastman et al. | 502/307 X |
| 4,444,905 | 4/1984 | Peasimisis | 502/213 X |
| 4,520,128 | 5/1985 | Morales et al. | 502/210 |

FOREIGN PATENT DOCUMENTS 56-40432  9/1979  Japan .................. 502/210

*Primary Examiner*—Helen M. S. Sneed
*Assistant Examiner*—William G. Wright
*Attorney, Agent, or Firm*—Bachman & LaPointe

[57] ABSTRACT

A cobalt-molybdenum catalyst and a method for preparing same, said catalyst useful for the hydrodesulfurization (HDS) and hydrodenitrogenation (HDN) of distillates of petroleum. The catalyst is supported by aluminum phosphate or an aluminum borate. In a preferred embodiment the catalyst has a low cobalt content, between 0.5% and 2.0% by weight calculated as CoO, and a molybdenum content of between 10% and 20% by weight, calculated as $MoO_3$. The phosphorus or boron compounds added to the aluminum before the impregnation of the active metals prevents the formation of undesirable compounds of the $CoAl_2O_4$ type, which is inactive in HDS. It is for that reason that the catalyst has a formulation with 70% less cobalt than the previous state-of-the-art catalysts. Very small crystals, highly dispersed on the surface of the catalyst, whose formula is $CoMoO_4$, are responsible for the stability and the high level of activity in HDS and HDN which results.

21 Claims, 1 Drawing Sheet

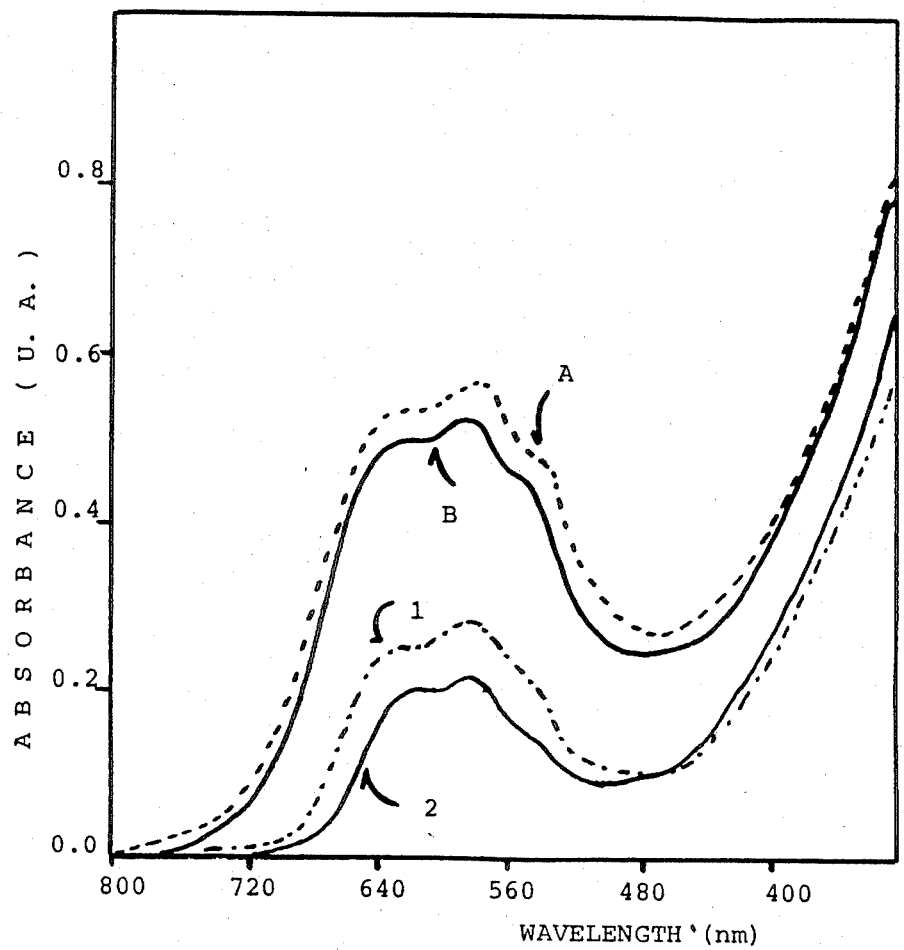
SPECTRA OF DIFFUSE REFLECTANCE SPECTROSCOPY OF THE CATALYSTS OF EXAMPLE I.

CATALYST FOR HYDROTREATMENT OF DISTILLATES OF PETROLEUM AND METHOD FOR THE PREPARATION OF SAME

BACKGROUND OF THE INVENTION

This invention is related to a catalyst for the conversion of hydrocarbons which catalyzes the reaction of hydrogen with organic-sulfur and organic-nitrogen compounds. In particular, the invention relates to a catalyst for hydrodesulfurization (HDS) and hydrodenitrogenation (HDN) of distillates of petroleum, such as vacuum distillates, atmospheric distillates, diesel fuel, kerosene, and gasolines, with high catalytic activity and stability. More particularly, the present invention relates in its preferred embodiment to a cobalt-molybdenum catalyst supported by an aluminum phosphate or aluminum borate useful in the hydrotreatment of distillates of petroleum, and a method for the preparation of same. The catalyst has a lower cobalt content than the previous state-of-the-art catalysts, but is competitive with them in terms of activity and stability.

Petroleum refining makes use of catalysts with special properties to stimulate the HDS and HDN reactions, by placing the catalyst in contact with hydrogen and charges of vacuum gas oils under specific conditions of temperature and pressure. In that way, the organic-sulfur and organic-nitrogen compounds are converted to hydrogen sulfide and ammonia, which are eliminated, and a product of much higher commercial value is obtained.

Many patents have been issued in recent years, making claims for compositions for differing catalysts and conditions of processing which result in the HDS and HDN of distillates of petroleum origin. These catalytic compositions make it possible to obtain acceptable operating cycles and products with low sulfur and nitrogen content. In this sense, catalysts containing specific combinations of metals selected from the VIB and VIII Groups of the Periodic Table, with and without phosphorus, have been claimed in numerous patents corresponding to the pre-existing state of the art. In particular, U.S. Pat. Nos. 3,649,523, 3,749,663, 3,755,150, 3,755,196, 3,840,472, 4,306,965, 4,382,854, 4,389,304 4,396,500 and 4,520,128 are related to the foregoing.

In general, the composition of the catalysts claimed in those patents is of the CoMo-$Al_2O_3$ and the NiMo-$Al_2O_3$ types, containing from 1% to 10% by weight of oxides of cobalt or nickel and from 10% to 30% by weight of molybdenum oxide supported by alumina. In addition, the formulations of the CoMoP-$Al_2O_3$ and NiMoP-$Al_2O_3$ types have high concentrations of metal oxides, similar to those of catalysts without phosphate, and they show special relationships with P/$MoO_3$ of between 0.1 and 0.25, or stoichiometric relationships of P/Mo=1.0, with the aim of increasing the catalytic activity in HDS and HDN in the said catalysts. The phosphorus is generally used to stabilize the cobalt-molybdenum or the nickel-molybdenum solutions and to permit the deposition of the metals on the support base in a single step. This reduces costs involved in the preparation of the catalyst as compared with the two-step sequential processes of impregnation.

It is well known in the field that, in the preparation of the CoMo-$Al_2O_3$ catalyst, the cobalt acts as a promoter of the HDS reaction. Nevertheless, it is necessary to add large concentrations of cobalt, since a part of that metal migrates to the alumina grid, forming a spinel of the $CoAl_2O_4$ type, which is well known in the field. This compound is inactive in HDS, as a result of which, a large part of the cobalt thus deposited is lost. Generally, this cobalt spinel is detected in the state-of-the-art catalysts through spectroscopic analysis such as the Diffuse Reflectance Spectroscopy technique, which permits the visualization of the triplet of bands characteristic of the compound indicated above, located at 625, 590, and 550 mm.

SUMMARY OF THE INVENTION

In accordance with the present invention it has now been found that an improved catalyst is provided useful in the hydrotreatment of distillates of petroleum containing sulfur and nitrogen and a method for the production of same. The method of the present invention comprises: providing a support base selected from the group consisting of aluminum phosphate and aluminum borate; first impregnating said support base with a solution containing a metal selected from Group VIB of the Periodic Table of Elements to deposit a concentration of said Group VIB metal of between 10 and 20% by weight calculated as oxide on said support base; and second impregnating the first impregnated support base with a solution containing a metal selected from Group VIII of the Periodic Table of elements to deposit a concentration of said Group VIII metal of between 0.5 and 2.0% by weight calculated as oxide on said support base.

The improved catalyst of the present invention comprises a support base selected from the group consisting of aluminum phosphate and aluminum borate impregnated with between 10 and 20% by weight of a Group VIB metal calculated as oxide and impregnated with between 0.5 and 2.0% by weight calculated as oxide of a Group VIII metal. The catalyst of the present invention has a surface area between 120 and 300 $m^2$/g, a total volume of pores of between 0.4 and 0.5 cc/g, bleedings with diameters of between 1/32 and 1/24 of an inch, and a bed resistance of between 10 and 19 Kg/$cm^2$.

The preferred Group VIB metal is molybdenum and the preferred Group VIII metal is cobalt. In various places throughout the present specification, Applicants discuss the present invention in connection with the preferred molybdenum and cobalt metals; however, it should be understood that any Group VIB metal may be employed and any Group VIII metal can be employed.

It is a particular advantage of the present invention that a cobalt-molybdenum catalyst is deposited on a support base of aluminum phosphate or aluminum borate with a low cobalt content. Furthermore, it is a particular advantage of the present invention that there is provided a method for the preparation of a catalyst which makes it possible to reduce the cobalt content of the same and, in addition, to disperse and increase very small crystals of $CoMoO_4$ on the surface of the support base, the said crystals being responsible for the stability and high catalytic activity of the catalyst. The new catalyst has a cobalt content of between 0.5% and 2.0% by weight, calculated as CoO, and its $MoO_3$ content is between 10% and 20%. The addition of small amounts of a phosphorus or boron compound to the alumina before the deposition of the active metals makes it possible to reduce the cobalt content, as well as to form small crystals of $CoMoO_4$ on the surface of the catalyst; those crystals are highly active in HDS and HDN of distillates of petroleum.

BRIEF DESCRIPTION OF THE DRAWING

The drawing is a graph which illustrates a spectrum obtained from the catalysts of the invention and two catalysts representing the previous state of the art, using the Diffuse Reflectance Spectroscopy technique. The bands are characteristic of the undesirable $CoAl_2O_4$ type compound.

DETAILED DESCRIPTION

The invention is related to a catalyst and a method for its preparation, composed of active metals deposited on a support base of aluminum borate or aluminum phosphate. This catalyst can be used to eliminate nitrogen and sulfur, preferably sulfur, from the charges originating in the primary distillation of for example the following types of petroleum: vacuum distillates, atmospheric distillates, diesel fuel, kerosenes, and gasolines.

Preparation of the Support Base

The support base is usually prepared in the form of spheres, tablets, or bleedings, preferably in the form of bleedings of sizes between 1/40 and ¼ of an inch or between 1/32 and 1/24 of an inch. Methods well known in the field are used in their preparation, for example, a gel of peptized alumina is prepared, taking the alumina powder dried by the spray method and adding limited amounts of acid. Then, quantities of between 0.1% and 1.5% by weight of a compound containing phosphorus or boron, calculated as $P_2O_5$ and $B_2O_3$, respectively, are added to the peptized Al gel. The aluminum phosphate gel is then bled to give it form and dimensions as indicated above, and finally, the bleedings are dried at temperatures preferably of between 38° and 130° C. The aluminum phosphate or aluminum borate support base is then roasted, using a temperature preferably higher than 470° C. in order to convert the aluminum phosphate or aluminum borate gel into stable oxides. Generally, a preferred temperature of between 500° and 700° C. is sufficient to complete the transformation in question.

The support base used in the preparation of the new catalyst can also for example be manufactured from the peptized alumina gel, bleeding the said gel to give it a particular form and then drying and roasting it to reach the preferred conditions as indicated above. Finally, the phosphorus or boron compound is added in amounts of between 0.2% and 1.0% by weight, calculated as $P_2O_5$ or as $B_2O_3$. Then the bleedings are dried at temperatures of between 20° and 130° C., but preferably at between 25° and 120° C., so as then to proceed to the deposition of the active metals.

The support base prepared in accordance with the two methodologies indicated above, are similar in their properties. Furthermore, the said support bases have the same physical properties: they both have a specific surface of between 90 and 350 m²/g, preferably between 120 and 300 m²/g; they both have a total volume of pores of between 0.4 and 0.6 cc/g; they both have a bed resistance of between 9 and 20 Kg/cm², preferably between 10 and 19 Kg/cm²; and they both have the form of bleedings with sizes of between 1/40 and ¼ of an inch, preferably between 1/32 and 1/24 of an inch.

Preparation of the Catalyst

To prepare the catalyst of the present invention, the aluminum phosphate or aluminum borate support base is impregnated with an aqueous solution containing a metal selected from the VIB Group of the Periodic Table of Elements, preferably molybdenum or tungsten, and as between those two, preferably molybdenum. This aqueous solution contains from 9% to 24% by weight of molybdenum, calculated as $MoO_3$. Following a contact time period of the solution and support base of between 5 and 120 minutes, preferably from 7 to 60 minutes, the solution not absorbed by the support base is filtered, and then the bleedings impregnated with molybdenum are dried at a temperature of between 20° and 200° C., preferably from 30° to 150° C., and then roasted at a temperature of between 480° and 750° C., preferably between 500° and 680° C. in order to transform the molybdenum salts contained in the pores of the support base into oxides.

The support base impregnated with molybdenum is placed in contact with an aqueous solution containing a metal selected from the VIII Group of the Periodic Table, preferably cobalt or nickel, and as between the two, preferably cobalt, in amounts of between 0.5% and 2.0% by weight, calculated as CoO. The solution-support base contact time must be between 5 and 120 minutes, preferably from 7 to 60 minutes. Then the solution not absorbed by the support base is filtered and the bleedings are dried at a temperature of between 20° and 200° C., preferably between 30° and 150° C. The dry bleedings are finally roasted under air at a temperature of between 300° and 600° C., preferably from 350° to 550° C., to transform the cobalt salts into oxides. The roasting temperature in this stage is a limiting factor, since a temperature of more than 550° C. can break the blockage of the tetrahedral site of the alumina created by the atoms of phosphorus or boron, thereby increasing the formation of the undesirable $CoAl_2O_4$ type compound, and the catalyst would then lose catalytic activity.

The chemical composition of the catalyst is as follows with reference to the preferred Group VIB and Group VIII metals: its preferred molybdenum content is from 10% to 20% by weight, calculated as $MoO_3$; its preferred cobalt content is from 0.5 to 2.0%, calculated as CoO. Naturally, the same applies to other Group VIB and Group VIII metals. The amount of phosphorus or boron needed to block the tetrahedral site of the alumina must be from 0.2% to 1.0% by weight, calculated as $P_2O_5$ or $B_2O_3$. These amounts are preferable since they permit the preparation of the catalyst with a low cobalt content.

The catalyst emits signals when analyzed by XPS (X-Ray Photoelectronic Spectroscopy). These signals are related to the amounts of metal present on the surface of the catalyst and are responsible for the catalytic activity and the stability of the catalyst. The XPS technique consists of exciting the atoms of the material with X-Rays and measuring the spectrum of energy of the electrons emitted by photoemission. As the X-Rays only penetrate a few angstroms into the material, the spectrum obtained is therefore a measure of the amount of metal present on the surface of the catalyst. The XPS studies were carried out using a Leybold LHS-10 type surface analysis instrument which consists of an X-Ray source, an energy analyzer, and a detection system. The conditions of analysis were the following: Radiation $h\nu = 1253.6$ eV, emitted by a magnesium cathode (MgK) having 300 volts and an energy of state of 50 eV carbon (1s, 285 eV) and aluminum (2p, 74.8 eV) were taken as references for the calculation of the energy of bonding of the metals. Furthermore, the surface dispersion of the said metals was determined by measuring the total area of the doublet corresponding to the molybdenum (3d, 3/2-5/2) and the total area of the peak corresponding to the cobalt (2p), and dividing each area by the corresponding area of aluminum (2p) plus the area of the peak of the metal whose dispersion is sought.

The preferred dispersions determined by XPS for the catalyst which is the object of this invention, in its oxidized state, are as follows: Mo/Al+Mo between 3.0 and 9.7, and Co/Al+Co between 0.4 and 6.0. The phosphorus and boron do not present characteristic surface bands, which demonstrates that they are not present on the surface of the catalyst in question.

The catalyst of the present invention, when analyzed with the Diffuse Reflectance Spectroscopy technique, shows a triplet of bands located at 625, 590, and 550 mm corresponding to the spinel of cobalt of the $CoAl_2O_4$ type. This triplet of bands is 2 to 4 times less than the triplet of bands of a catalyst reflecting the previous state of the art (see FIG. 1). This fact demonstrates that the catalyst of the present invention has from 2 to 4 times less of the undesirable $CoAl_2O_4$ type compound than the commercial catalysts reflecting the previous state of the art. Furthermore, when the present catalyst is analyzed by the X-Ray Diffraction technique well known in the previous state of the art, lines are observed at 3.3747 (100%), 3.4638 (34%), and 6.9576 (24%) angstroms, which are characteristic of a compound of the $CoMoO_4$ type, whose very small crystals are widely dispersed on the surface of the catalyst. This fact is evidence of the fact that the cobalt interacts with the molybdenum, forming the compound indicated above. That compound is responsible for the high catalytic activity observed in the said catalyst.

The physical properties of the present catalyst are as follows: it has a surface area of between 90 and 350 $m^2/g$, preferably from 120 to 300 $m^2/g$; its total volume of pores is between 0.3 and 0.7 cc/g, preferably from 0.4 to 0.6 cc/g. The preferred size of the bleedings is between 1/32 and 1/24 of an inch in diameter, and it has a bed resistance of between 9 and 20 $Kg/cm^2$, preferably from 10 and 19 $Kg/cm^2$.

Conditions for the Use of the Catalyst

The present catalyst, prepared in accordance with the method described in this invention and having the physical, chemical, and surface properties described above, can be used in the fixed particle bed using a fixed-bed reactor which operates under the following preferred conditions: temperature between 315° and 450° C.; pressure between 500 and 1500 psig; spatial velocity between 0.1 and 3.0 $m^3/m^3.h$ and a velocity of recycling of hydrogen per barrel of charge of between 200 and 1000 $Nm^3/m^3$. In addition, the distillates of petroleum which can be processed as charges with the catalyst of the invention are: vacuum distillates, atmospheric distillates, diesel fuel, kerosene, or gasolines containing large amounts of impurities, preferably containing amounts of sulfur exceeding 0.5% by weight and amounts of nitrogen exceeding 100 ppm.

The presulfurization of the present catalyst in its oxidized state must be carried out under controlled conditions, so as to avoid destroying the surface dispersion of the deposited hydrogenizing metals. The preferred conditions of presulfurization are as follows: the pressure should be between 200 and 600 psig; the temperature between 230° and 360° C., and is increased at the rate of 20° C./h; the spatial velocity between 1.0 and 3.0 $m^3/m^3.h$. The time for the presulfurization should be between 1 and 8 hours and it should be conducted using a vacuum gas oil preferably containing from 2% to 5% sulfur by weight added in the form of carbon disulfide. But a mixture of $H_2/H_2S$ (preferably between 10% and 15% of $H_2S$ by weight), sulfur in elemental form, mercaptans, thiols, thiophene, or any other compound containing sulfur in its structure can also be used as presulfurization charges.

Typically, the catalyst in its sulfurized form is much more active in HDS than the catalyst in oxidized form. The presulfurization can be done in situ, under the preferred conditions indicated above, prior to beginning the reaction of hydrotreatment of the distillate of petroleum with hydrogen. The present catalyst has a low cobalt content, but is nevertheless highly active and stable in HDS/HDN; with a single pass of the charge through the catalytic bed, a high degree of elimination of sulfur and nitrogen from the charge is obtained. The low degree of deactivation of the catalyst makes possible operating cycles of more than 20 months without the need to regenerate the catalyst.

The invention is fully illustrated by the examples which are set out below, but the said examples should not be interpreted as limiting the present invention.

EXAMPLE I

Two catalysts were prepared in accordance with the preferred conditions for the invention, identified as: Catalyst (1) and Catalyst (2) according to the nature of the support base, aluminum phosphate or aluminum borate respectively. These catalysts were evaluated under HDS conditions and the results were compared with those obtained from the use of available commercial catalysts, identified as Catalyst A and Catalyst B. Table I summarizes the set of physical, chemical, and surface properties of the four catalysts in question.

The two catalysts of the invention and the two reference catalysts were each presulfurized using an atmospheric distillate with 3% of sulfur by weight, added as carbon disulfide under the following experimental conditions: pressure=500 psig; temperature=230° to 360° C., increasing at the rate of 20° C. per hour and remaining at 360° C. for four hours. A spatial velocity of 2.5 $m^3/m^3.h$ was used, as well as a $H_2$/charge relationship of 300 $Nm^3/m^3$.

Following presulfurization, the charge, a Venezuelan vacuum distillate, whose relevant properties are indicated in Table II, was pumped. The operating conditions used to evaluate the four catalysts were always identical and were as follows: T=360° C., P=750 psig, LHSV=1 $m^3/m.h$, and a $H_2$/Charge relationship=300 $Nm^3/m^3$.

TABLE I

| | PROPERTIES OF THE CATALYSTS | | | |
|---|---|---|---|---|
| | PRESENT INVENTION CATALYST | | PRIOR ART CATALYST | |
| PROPERTIES | (1) | (2) | (A) | (B) |
| CHEMICAL | | | | |
| $MoO_3$, wt % | 15.0 | 15.0 | 20.0 | 15.5 |
| CoO, wt % | 2.0 | 2.0 | 5.0 | 4.7 |

TABLE I-continued
PROPERTIES OF THE CATALYSTS

| PROPERTIES | PRESENT INVENTION CATALYST | | PRIOR ART CATALYST | |
|---|---|---|---|---|
| | (1) | (2) | (A) | (B) |
| $P_2O_5$, wt % | 0.5 | — | 3.0 | — |
| $B_2O_3$, wt % | — | 0.5 | — | — |
| $Al_2O_3$, wt % | Balance | Balance | Balance | Balance |
| PHYSICAL | | | | |
| Surface area, $m^2/g$ | 150 | 250 | 159 | 270 |
| Volume of pores, cc/g | 0.62 | 0.62 | 0.40 | 0.54 |
| Size, inch | 1/16 | 1/16 | 1/16 | 1/16 |
| Bed Resistance, $Kg/cm^2$ | 15 | 15 | 13 | 11.4 |
| Density of bed, g/cc | 0.78 | 0.79 | 0.80 | 0.78 |
| SURFACE | | | | |
| Mo/(Al + Mo) | 6.0 | 5.9 | 7.3 | 6.1 |
| Co/(Al + Co) | 3.8 | 4.0 | 4.0 | 5.0 |
| P/(Al + P) | ND* | ND* | 5.0 | — |
| $CoMoO_4$ (X-Ray) | Yes | Yes | ND* | ND* |

*ND = NOT DETECTED

TABLE II
PROPERTIES OF THE CHARGE

| PROPERTIES | VACUUM DISTILLATE |
|---|---|
| Gravity API | 17.4 |
| Conradson Carbon, wt % | 0.19 |
| Sulfur, wt % | 2.18 |
| Nitrogen, ppm | 1170 |
| Carbon, wt % | 85.05 |
| Hydrogen, wt % | 11.44 |
| Saturates, wt % | 37.82 |
| Aromatics, wt % | 62.18 |
| N° Bromine | 5 |
| Viscosity 140° F., Cst | 43.8 |
| DISTILLATION, % V | |
| $C_5$-180° C. | 0.0 |
| 180-370° C. | 22.2 |
| 370° C.+ | 79.8 |

Table III presents the results for activity in HDS and HDN for the catalysts identified above. It is evident that Catalysts (1) and (2) of the present invention in both versions achieved a higher level of activity in HDS and HDN than the catalysts incorporating the previous state of the art, in spite of the fact that these have a cobalt content, calculated as CoO some 60% less. This fact is evidence that the catalysts to which the invention refers have sufficient active sites in HDS and HDN of the $CoMoO_4$ type to achieve catalytic activity levels similar to those obtained with commercial catalysts having high cobalt content (5% by weight). The phosphorus or boron prevents the formation of the undesirable $CoAl_2O_4$ compound and increases the formation of the $CoMoO_4$ type active compound on the surface of the catalyst.

EXAMPLE II

This example has the purpose of determining the operating cycle, the velocity of deactivation, and the consumption of hydrogen of the catalysts included in Example I. For this purpose, the same charge and operating conditions were used, and a run of one month's duration (approximately 10 bbl/kb) was conducted in order to visualize the degree of deactivation of the catalysts and the temperature which it is necessary to increase for each day of operation in order to maintain the requirements for sulfur and for the end product. Table III indicates that the catalyst of the present invention is stable during the entire period of operation, since the daily increase in temperature does not exceed 0.20° C. These values are comparable with those obtained using the catalysts representing the previous state of the art. In addition, admitting a maximum temperature of the reactor of 405° C. it is possible to calculate that the operating cycle for the catalyst of the present invention is also comparable to that of the commercial catalysts.

TABLE III
EVALUATION OF THE CATALYSTS

| ACTIVITIES AND PARAMETERS OF EVALUATION | PRESENT INVENTION CATALYST | | PRIOR ART CATALYST | |
|---|---|---|---|---|
| | (1) | (2) | (A) | (B) |
| HDS, wt %[a] | 92 | 93 | 89.8 | 91.5 |
| HDN, wt %[a] | 35 | 34 | 35 | 28.5 |
| Deactivation,[b] °C./Day | 0.06 | 0.05 | 0.07 | 0.07 |
| Operating Cycle,[b] m | 22 | 23 | 17 | 21 |
| Hydrogen consumption, $Nm^3m^3$[a] | 56 | 55 | 55 | 62 |

[a] T = 360° C.; P = 750 psig; LHSV = 1 $m^3/m^3 \cdot h$; $H_2$/GOV = 300 $Nm^3/m^3$
[b] T = 360-405° C.; P = 750 psig; LHSV = 2 $m^3/m^3 \cdot h$; $H_2$GOV = 300 $Nm^3/m^3$

EXAMPLE III

The purpose of this example is to demonstrate that the addition of phosphorus or boron to the alumina in the form of a peptized gel, or to the preformed alumina in bleedings, does not modify the field of action of the catalyst. To demonstrate this, two additional catalysts of the present invention, Catalyst (3) and Catalyst (4), were prepared, adding 0.5% by weight of $P_2O_5$ or $B_2O_3$ respectively to the peptized alumina gel, and following the preferred condition for the invention. These catalysts are evaluated under the same experimental conditions as used in Example I and the results were compared with those obtained with Catalyst (1) and Catalyst (2), which had been prepared with a preformed alumina support base in the form of bleedings of 1/16 of an inch, adding the phosphorus and boron in the concentrations indicated above.

The results obtained, shown in Table IV, reveal that the activities of HDS and HDN given by the four catalysts of the present invention are very similar and show in addition that the blockage of the tetrahedral sites of the alumina by the phosphorus or the boron does not depend on the form of the alumina for the final molding of the support base and the final preparation of the catalyst.

TABLE IV
CATALYTIC ACTIVITIES

| ACTIVITIES AND PROPERTIES | CATALYST | | | |
|---|---|---|---|---|
| | (1) | (2) | (3) | (4) |
| HDS, wt % | 92 | 93 | 91.5 | 92 |
| HDN, wt % | 35 | 34 | 34 | 35 |
| API, degrees | 22.5 | 22 | 21.6 | 21.6 |
| Viscosity, 140° F., Cst | 31 | 32 | 32.5 | 32 |
| N° Bromine | 2 | 2 | 2 | 2 |
| Conradson Carbon, wt % | 0.15 | 0.15 | 0.15 | 0.15 |

T = 360° C.; P = 750 psig; LHSV = A $m^3/m^3 \cdot h$; $H_2$/GOV = 300 $Nm^3/m^3$

EXAMPLE IV

The intention of this example is to demonstrate that, using the manufacturing procedure for the catalyst of the invention, the formation of the spinel of $CoAl_2O_4$, is considerably reduced. Catalyst (1) and Catalyst (2) were analyzed using the Diffuse Reflectance Spectroscopy technique, and the results were compared with those obtained from the use of Catalysts A and B of Example I.

The drawing shows that the triplet of bands, located at 625, 590, and 550 mm, characteristic of a cobalt spinel of the $CoAl_2O_4$ type in the two catalysts of the invention are from 2 to 4 times lower in intensity than those given by the catalysts based on the previous state of the art.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A method for the production of a catalyst useful in the hydrotreatment of distillates of petroleum containing sulfulr and nitrogen which comprises:
   (a) providing a support base prepared by adding a compound selected from the goup consisting of phosphorus and boron in an amount of between 0.2 to 1% by weight calculated as an oxide to a peptized alumina gel to obtain a support base of aluminum phosphate or aluminum borate having the tetrahedral sites of alumina blocked by the phosphorus or boron;
   (b) first impregnating said support base with a solution containing a metal selected from Group VIB of the Periodic Table of Elements to deposit a concentration of said Group VIB metal of between 10 and 20% by weight calculated as oxide on said support base; and
   (c) second impregnating the first impregnated support bse with a solution containing a metal selected from Group VIII of the Periodic Table of Elements to deposit a concentration of said Group VIII metal of between 0.5 and 2.0% by weight calculated as oxide on said support base such that small crystals of $CoMoO_4$ are disbursed on the surface of said support base thereby increasing catalytic activity of the catalyst.

2. A method according to claim 1 wherein said Group VIB metal is molybdenum.

3. A method according to claim 1 wherein said Group VIII metal is cobalt.

4. A method according to claim 1 wherein said first and second impregnation steps include filtering the solutions not absorbed by the support base and drying the impregnated support base at a temperatuare of between 30° and 150° C. for more than 1 hour.

5. A method according to claim 4 including the steps after drying of roasting at a temperature of between 500° and 680° C. for more than 1 hour using a current of air.

6. A method according to claim 1 wherein the support base has a surface area of between 120 and 300 $m^2/g$, a total volume of pores of between 0.4 and 0.6 cc/g, a bed resistance of between 10 and 19 $Kg/cm^2$, and bleedings with diameters of between 1/32 and 1/24 of an inch.

7. A method according to claim 1 including the step of placing the support base in contact with the aqueous solution of the active metals in steps (b) and (c) for between 7 and 60 minutes.

8. A method according to claim 1 which includes the step of presulfurization of the resultant catalyst at a temperature of between 230° and 360° C., with a controlled increase in temperature of no more than 20° C. per hour, using a pressure of between 200 and 600 psig and a spatial velocity of between 0.1 and 3.0 $m^3/m^3.h$, and as a charge, any feedstock which contains sulfur during a period of from 1 to 8 hours.

9. A method according to claim 1 which includes the use of a metal from Group VIB and one from Group VIII of the Periodic Table in the form of sulfides.

10. A catalyst useful in the hydrotreatment of distillates of petroleum which contains sulfur and nitrogen which has a surface area of between 120 and 300 $m^2/g$, a total volume of pores of between 0.4 and 0.5 cc/g, bleedings with diameters of between 1/32 and 1/24 of an inch, a bed resistance of between 10 and 19 $Kg/cm^2$, said catalyst containing a metal from Group vIB of the Periodic Table in concentrations of between 10% and 20% by weight calculated as an oxide, a metal from Group VIII of the Periodic Table in amounts of between 0.5% and 2.0% by weight calculated as oxides, a material selected from the group consisting of phosphorus and boron in amounts of between 0.2% and 1.0% by weight each, calculated as $P_2O_5$ or $B_2O_3$, and small crystals of $CoMoO_4$ disbursed on the surface of said support base thereby increasing catalytic activity of the catalyst.

11. A catalyst according to claim 10 wherein said Group VIB metal is molybdenum and said Group VIII metal is cobalt.

12. A catalyst according to claim 11 which presents a surface composition for the Group VIB and Group VIII metals, determined by XPS analysis as follows: Mo/(Al+Mo) of between 3.0 and 9.7 where Co/(Al+Co) is between 0.4 and 6.0 respectively wherein phosphorus and boron oxides prevent the formation of undesirable $CoAl_2O_4$ type compounds.

13. A catalyst according to claim 11 which presents a triplet of bands located at 625, 590, and 550 mm, characteristic of the $CoAl_2O_4$ compound, when the catalyst is analyzed by the Diffuse UV-Visible Light Reflectance technique, with an intensity of 2 to 4 times less than that of a catalyst which does not contain phosphorus or boron in concentrations of between 0.2 and 1.0% by weight, calculated as oxides.

14. A catalyst according to claim 11 which presents lines at 3.3747 (100%), 3.4638 (34%), and 6.9576 (24%) when analyzed by X-Ray Diffraction, corresponding to a compound well dispersed over the surface of the catalyst and corresponding to a compound of the $CoMoO_4$ type.

15. A catalyst useful in the hydrotreatment of distillates of petroleum which contains sulfur and nitrogen which comprises a support base selected from the group consisting of aluminum phosphate and aluminum borate impregnated with a first metal selected from Group VIB of the Periodic Table of Elements in an amount of between 10 and 20% by weight calculated as oxide, a second metal selected from Group VIII of the Periodic Table of Elements in an amount of between 0.5 and 2% by weight calculated as oxide, and small crystals of $CoMoO_4$ disbursed on the surface of said support base thereby increasing catalytic activity of the catalyst.

16. A catalyst according to claim 15 having a surface area of between 120 and 300 $m^2/g$ and a total volume of pores of between 0.4 and 0.5 cc/g.

17. A catalyst according to claim 16 having bleedings with diameters of between 1/32 and 1/24 of an inch and bed resistance of between 10 and 19 $Kg/cm^2$.

18. A catalyst according to claim 17 containing phosphorus in amounts of between 0.2 and 1.0% by weight calculated as $P_2O_5$.

19. A catalyst according to claim 17 containing boron in amounts of between 0.2 and 1.0% by weight calculated as $B_2O_3$.

20. A catalyst according to claim 17 wherein said Group VIB metal is molybdenum and said Group VIII metal is cobalt.

21. A catalyst according to claim 17 including small crystals of $CoMoO_4$ on the surface of the support base.

* * * * *

UNITED STATES PATENT AND TRADEMARK OFFICE
CERTIFICATE OF CORRECTION

PATENT NO. : 4,743,574

DATED : May 10, 1988

INVENTOR(S) : Alfredo L. Morales et al.

It is certified that error appears in the above-identified patent and that said Letters Patent is hereby corrected as shown below:

In Column 9, claim 1, line 36, change "bse" to read --base--.

In Column 10, claim 10, line 16, change "vIB" to read --VIB--.

Signed and Sealed this

Second Day of May, 1989

*Attest:*

DONALD J. QUIGG

*Attesting Officer*    *Commissioner of Patents and Trademarks*